(12) United States Patent
Takahashi

(10) Patent No.: US 6,643,098 B2
(45) Date of Patent: Nov. 4, 2003

(54) HEAD SLIDER HAVING A TERMINAL GROUP OF LUBRICANT OF LUBRICATION LAYER DIFFERENT FROM THAT OF A MEDIUM

(75) Inventor: Shinichi Takahashi, Kawasaki (JP)

(73) Assignee: Fujistu Limited, Kawasaki (JP)

( * ) Notice: Subject to any disclaimer, the term of this patent is extended or adjusted under 35 U.S.C. 154(b) by 111 days.

(21) Appl. No.: 09/964,061

(22) Filed: Sep. 26, 2001

(65) Prior Publication Data

US 2002/0191338 A1 Dec. 19, 2002

(30) Foreign Application Priority Data

Jun. 15, 2001 (JP) ........................................ 2001-181916

(51) Int. Cl.[7] ............................................... G11B 5/60
(52) U.S. Cl. .................................................. 360/234.3
(58) Field of Search ......................... 360/234.3, 235.1, 360/235.2

(56) References Cited

U.S. PATENT DOCUMENTS

| | | | | |
|---|---|---|---|---|
| 5,781,376 A | * | 7/1998 | Tsukamoto | 360/235.1 |
| 5,808,833 A | * | 9/1998 | Motomatsu et al. | 360/235.2 |
| 6,249,403 B1 | * | 6/2001 | Tokisue et al. | 360/235.2 |
| 6,524,687 B2 | * | 2/2003 | Horng et al. | 428/216 |
| 6,529,346 B2 | * | 3/2003 | Otsuka | 360/235.8 |

FOREIGN PATENT DOCUMENTS

JP 63048674 A 3/1988

* cited by examiner

Primary Examiner—Robert S. Tupper
(74) Attorney, Agent, or Firm—Greer, Burns & Crain, Ltd.

(57) ABSTRACT

A head slider for recording and playing back signals on a medium while floating on the medium has a head slider body and a lubrication layer on a slider surface of the head slider body. A lubricant of the lubrication layer has a main chain structure the same as a main chain structure of a lubricant of a lubrication layer of the medium. However, a terminal group of the lubricant of the lubrication layer, which is applied on the head slider has different structure from a structure of a terminal group of the lubricant of the lubrication layer on the medium. Thus, the adhesion does not occur between the lubrication layers of the head slider and the medium. As a result, the glide height of the head slider from the medium can be reduced by a distance of sub-nano-orders. The floating height of the head slider from the medium is decreased so that a plurality of signals are recorded on the medium in a high density.

4 Claims, 19 Drawing Sheets

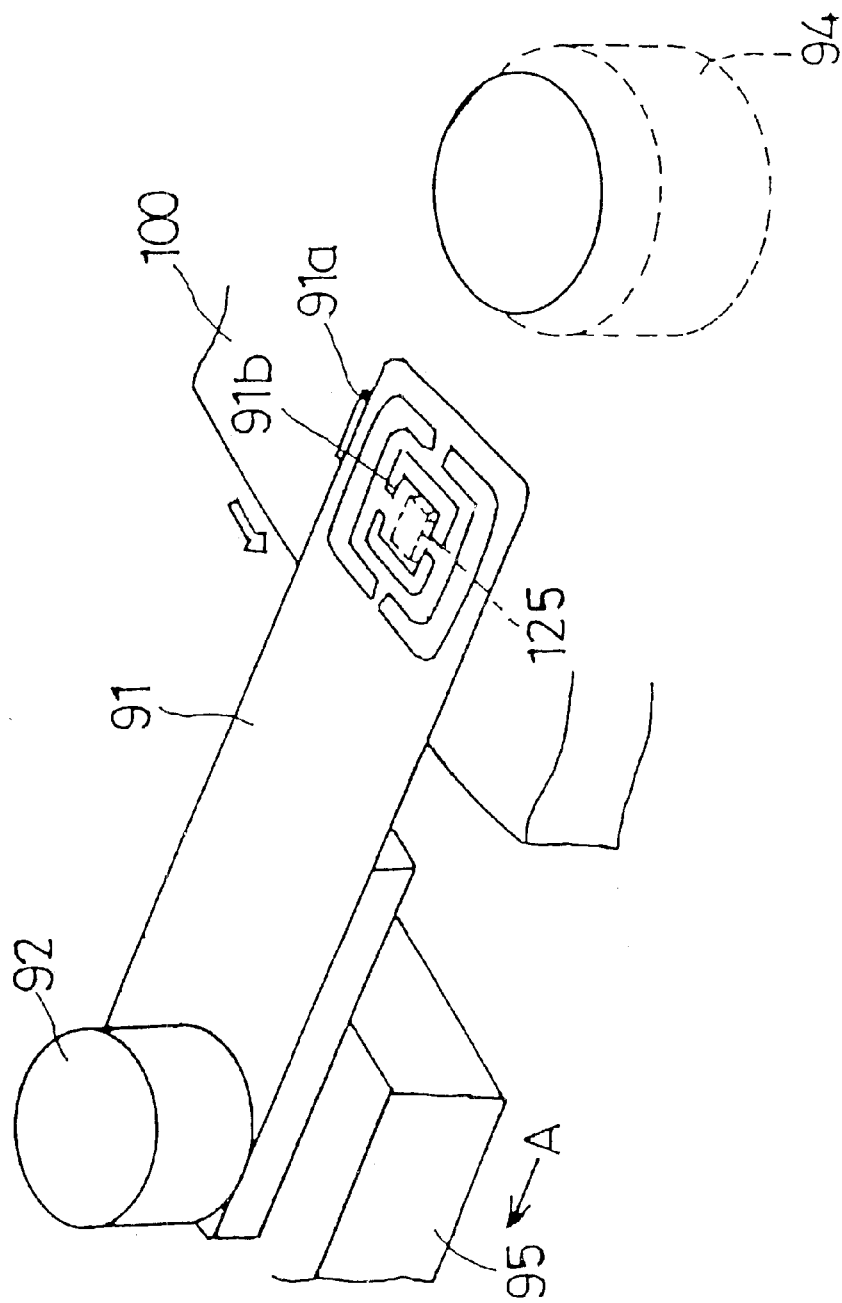

FIG. 4B  100a (Fomblin Zdol) / 100
FIG. 4C  101a / 101
FIG. 4D  102a / 102

FIG. 4E  110a (Fomblin Zdol) / 110
FIG. 4F  111 (Fomblin Zdol+X1P)
FIG. 4G  112 (Fomblin AM 3001) / 112a
FIG. 4H  113 (Amine) / 113a
FIG. 4I  114 (MORESCO PHOSFANOL) / 114a
FIG. 4J  115a (Fomblin Tetraol) / 115

FIG. 4K  120 / 120a (Fomblin Zdol)
FIG. 4L  121 / 121a (Fomblin AM 3001)
FIG. 4M  122 / 122a (Amine)
FIG. 4N  123 / 123a (MORESCO PHOSFANOL)
FIG. 4O  124 / 124a (Fomblin Tetraol)
FIG. 4P  125

FIG. 5
(A) Fomblin Zdol
-CH2-OH
(B) Fomblin AM 3001
-CH2O-CH2-⌬-O-CH2 (epoxide)
(C) Amine
-COOH⁻ ⁺3HN-(CH2)n-CH3
(D) MORESCO PHOSFANOL
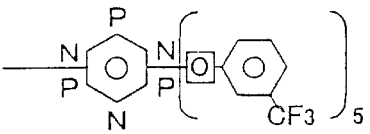
(E) Fomblin Tetraol
-CH2-OCH2-CH(OH)-CH2-CH
(F) X1P
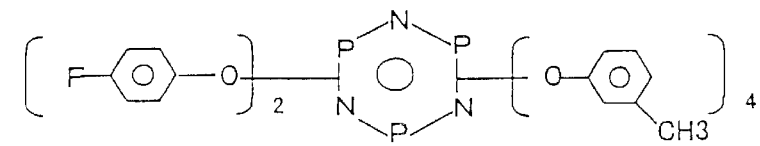

HARD DISK
TERMINAL GROUP OF
LUBRICANT:Fomblin AM 3001

HEAD SLIDER
TERMINAL GROUP OF
LUBRICANT:Fomblin Tetraol

FIG.18

| LUBRICANT OF HARD DISK | LUBRICANT OF A-HEAD SLIDER | LUBRICANT OF B-HEAD SLIDER | VARIATION BETWEEN A-HEAD SLIDER AND B-HEAD SLIDER |
|---|---|---|---|
| Fomblin Zdol 2000 | Fomblin AM 3001 GH VALUE 4.68~5.38 | Fomblin Zdol 2000 GH VALUE 5.49~6.50 | 0.75~1.27 |
| Fomblin AM 3001 | Fomblin Zdol 2000 GH VALUE 4.00~4.74 | Fomblin AM 3001 GH VALUE 4.39~5.33 | 0.15~0.59 |
| Fomblin Zdol 2000 | AMINE GH VALUE 5.20~5.96 | Fomblin Zdol 2000 GH VALUE 5.85~6.32 | 0.31~0.50 |
| AMINE | Fomblin Zdol 2000 GH VALUE 4.70~5.76 | AMINE GH VALUE 5.17~6.30 | 0.37~0.54 |
| Fomblin AM 3001 | Fomblin Tetraol GH VALUE 4.05~4.73 | Fomblin AM 3001 GH VALUE 4.58~5.00 | 0.25~0.60 |
| Fomblin Zdol 2000 | Fomblin Tetraol GH VALUE 4.00~4.74 | Fomblin Zdol 2000 GH VALUE 4.53~5.05 | 0.29~0.75 |

GH : GLIDE HEIGHT

HEAD SLIDER HAVING A TERMINAL GROUP OF LUBRICANT OF LUBRICATION LAYER DIFFERENT FROM THAT OF A MEDIUM

BACKGROUND OF THE INVENTION

1. Field of the Invention

This invention relates to a head slider, and more particularly, to a head slider, which floats above a rotating medium.

In an information memory storage device that has a medium rotatable at a high speed, a carriage having a head slider at an end thereof and a magnetic circuit rotating the carriage in opposite directions, it is required to further increase a density of record on the medium. In order to increase the record density of the medium, it is necessary to decrease a glide height of the head slider.

2. Description of the Related Art

A conventional head slider 10 is shown in FIG. 1. FIG. 1 shows a status that the conventional head slider is under writing or reading a record. A hard disk 20 rotates at a high speed and the head slider 10 floats above the hard disk 20 with a distance a due to air flow 25 induced by a high speed rotation of the hard disk 20. In addition, in a stop mode, the head slider 10 touches the surface of the hard disk 20.

The hard disk 20 comprises a magnetic layer 22 on the surface of the substrate 21 and a lubrication layer 23 having a thickness of several nanometers on the surface thereof. The lubrication layer 23 is formed so as to decrease a friction with the head slider 10 at the time of starting rotation of the hard disk 20, and to improve the durability of the hard disk 20.

The lubrication layer 23 is formed by applying a lubricant, and thereafter being processed by UV irradiation. A main chain of the lubricant is —(CF2–CF2O)n-(CF2-0)m-, and a terminal group of the lubricant is Fomblin Zdol(Ausimont) family.

The head slider 10 comprises a head slider body 11 made from ceramics and a magnetic head part 12 formed in the posterior-extremity surface 11a of the head slider body 11. A slider surface 13, which faces the hard disk 20, corresponds to a surface 11b on which the ceramics of the head slider body 11 is exposed.

In the combination of the above-mentioned head slider 10 and the hard disk 20, the floating distance a is about 5 nanometers. The floating distance a is a height of the head slider 10 from the hard disk 20. 5 nanometers is the lowest limit and it is difficult to make the floating distance smaller than 5 nanometers.

A cause of difficulty in reducing the floating distance is considered to be an adhesion between the slider surface 13 of the head slider 10 and the lubrication layer 23 of the hard disk 20 due to the lubricant of the lubrication layer 23 of the hard disk 20 being transferred to the slider surface 13 of the head slider 10.

As a method for preventing a transfer of the lubricant of the lubrication layer 23 of the hard disk 20 to the slider surface 13 of the head slider 10, JP, 6-64869, A discloses a composition of an organic silicone functional group layer which is chemically bonded to a surface of the head slider.

However, since the organic silicone functional group layer has characteristics of generating gas, the generated silicone gas enters between a hard disk and a head slider, which may result in occurrence of a risk of head crash.

SUMMARY OF THE INVENTION

It is a general object of the present invention to provide a head slider and an information memory storage device which solve the above-mentioned problems.

A more specific object of the present invention is to reduce the glide height of the head slider to the hard disk by a distance of sub-nano-orders without adhesion of lubricant layers of the head disk and the medium to each other.

In order to achieve the above-mentioned object, there is provided according to one aspect of the present invention a head slider for recording and playing back signals on a medium while floating on the medium, comprising:

a head slider body; and a lubrication layer on a slider surface of the head slider body, wherein a lubricant of the lubrication layer has a main chain structure the same as a main chain structure of a lubricant of a lubrication layer of the medium; and a terminal group has a structure different from a structure of a terminal group of the lubricant of the lubrication layer of the medium.

Additionally, in the head slider according to the present invention, the main chain of the lubricant of the lubrication layer of the head slider body may be —(CF2–CF2O)n-(CF2-0)m-;

the terminal group of the lubricant of the lubrication layer of the head slider body may be selected from a group consisting of Fomblin Zdol family, Fomblin AM 3001 (Ausimont) family, Amine family, MORESCO PHOSFANOL(matsumura Oil Research Cort.) family, and Fomblin Tetraol(Ausimont) family; and the terminal group of the head slider body may be different from the terminal group of the lubricant of the lubricant layer of the medium.

In order to achieve the above-mentioned object, there is also provided according to another aspect of the present invention, an information memory storage device comprising, within a housing having a base, a rotatable medium, a carriage having a head slider at an end thereof, and a magnetic circuit which rotates the carriage in opposite directions, wherein the medium including:

a substrate;

a magnetic layer on the substrate; and a lubrication layer on a surface of the medium, wherein the head slider has a head slider body; and a lubrication layer on a slider surface of the head slider body, wherein a lubricant of the lubrication layer has a main chain structure the same as the main chain structure of the lubricant of the lubrication layer of the medium and a terminal group having a structure different from the structure of the terminal group of the lubricant of the lubrication layer of the medium.

Additionally, in the information memory storage device according to the present invention, a main chain of the lubricant of the lubrication layer of the medium may be —(CF2–CF2O)n-(CF2-0)m-; and a terminal group may be selected from a group consisting of Fomblin Zdol family, Fomblin AM 3001 family, Amine family, MORESCO PHOSFANOL family, and Fomblin Tetraol family;

wherein a main chain of the lubricant of the lubrication layer of the head slider may be —(CF2–CF2O)n-(CF2-0)m-;

a terminal group is selected from a group consisting of Fomblin Zdol family, Fomblin AM 3001 family, Amine family, MORESCO PHOSFANOL family, and Fomblin Tetraol family; and the terminal group structure is different from the terminal group of the lubricant of the lubrication layer of the medium.

Additionally, in the information memory storage device according to the present invention, the lubricant of the lubrication layer of the medium has a structure in which X1P(Dow Chemical Company) may be added to Fomblin Zdol family; and the terminal group of the lubricant of the lubrication layer of the head slider is selected from a group consisting of Fomblin AM 3001 family, Amine family, MORESCO PHOSFANOL family, and Fomblin Tetraol family.

Additionally, in the information memory storage device according to the present invention, the terminal structure of the lubricant of the lubrication layer of the head slider may be Fomblin AM 3001 family.

According to the present invention, the structure of the terminal group of the lubricant of the lubrication layer of the head slider is different from the structure of the terminal group of the lubricant of the medium. Thus, the adhesion does not occur between the lubrication layer of the head slider and the lubrication layer of the medium. As a result, the glide height of the head slider to the medium is reduced by a distance of sub-nano-orders as compared with a case in which no lubrication layer is provided on the head slider and another case in which the same terminal group is provided to the lubrication layer of the hard disk. Thus, the floating height of the head slider to the medium can be decreased. Then, signals can be recorded on the medium in a high density.

In addition, the lubricant of the lubrication layer of the head slider and the lubricant of the lubrication layer of the medium have no characteristics of generating gas. So, the increase of the occurrence of a risk of head crash can be prevented even though the floating height of the head slider to the medium become small.

Further, the structure of the terminal group of the lubricant of the lubrication layer on the medium has a structure in which X1P is added to Fomblin Zdol family, whereas the terminal group of the lubricant of the lubrication layer on the head slider is Fomblin AM 3001 family. Thus, the floating height of the head slider to the medium can be decreased, and signals can be recorded on the medium in a high density.

Other objects, features and advantages of the present invention will become more apparent from the following detailed description when read in conjunction with the accompanying drawings.

BRIEF DESCRIPTION OF THE DRAWINGS

FIG. 4A is a perspective view showing an experimental equipment for measuring a glide height;

FIGS. 4B–4J are side views of hard disks for glide height measurement;

FIGS. 4K–4P are side views of head sliders for glide height measurement;

FIG. 5 is an illustration showing chemical structures of a terminal group of a lubricant.

FIG. 18 is a table showing numerical data of the graph of FIGS. 6, 9, 11, 13, 15, and 17.

DESCRIPTION OF THE PREFERRED EMBODIMENTS

First Embodiment

Figure 1:
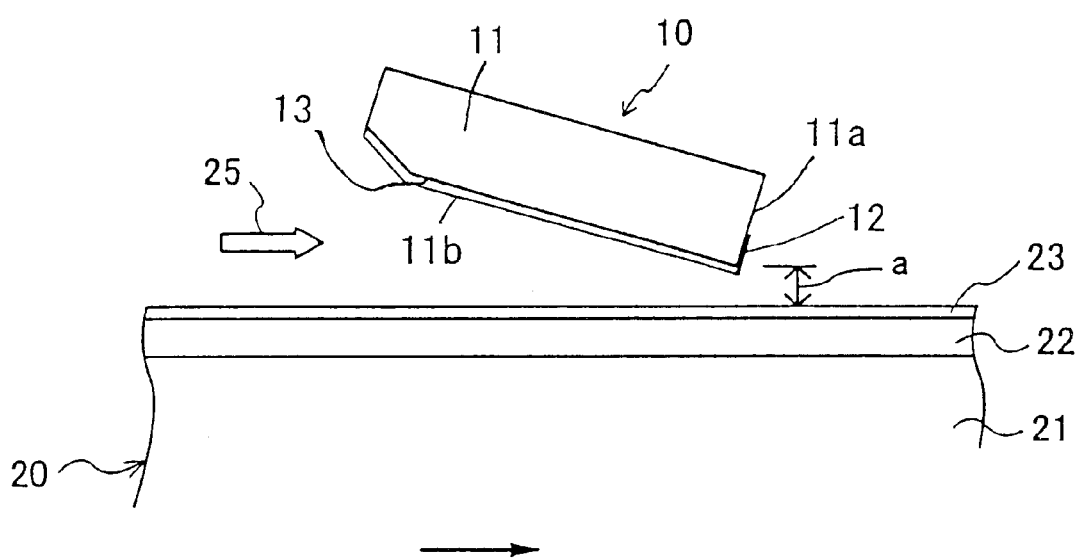
FIG. 1 is a side view of a conventional head slider floating above a hard disk.
Figure 2:
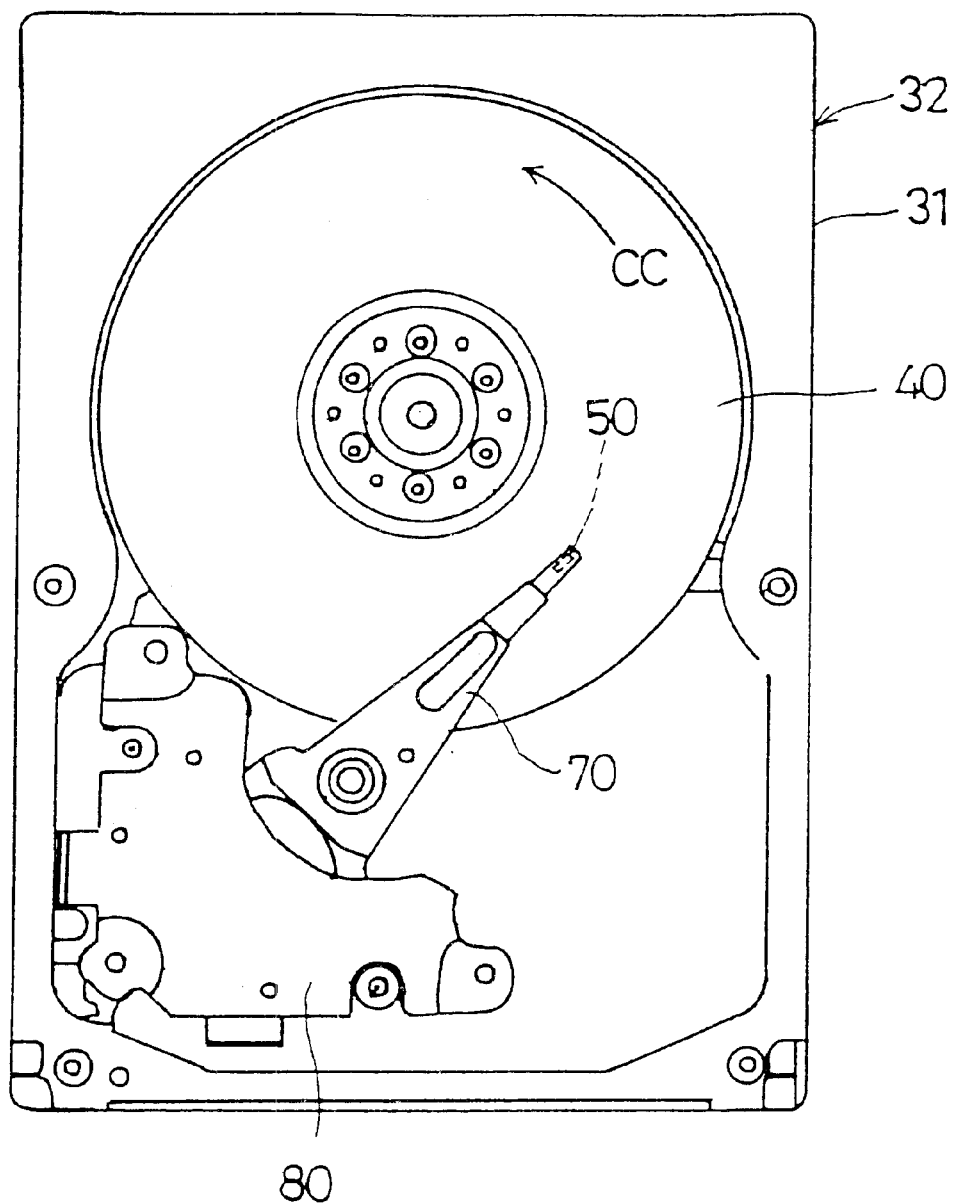
FIG. 2 is a plan view of a hard disk device of a first embodiment of the present invention wherein a cover is removed.
Figure 3:
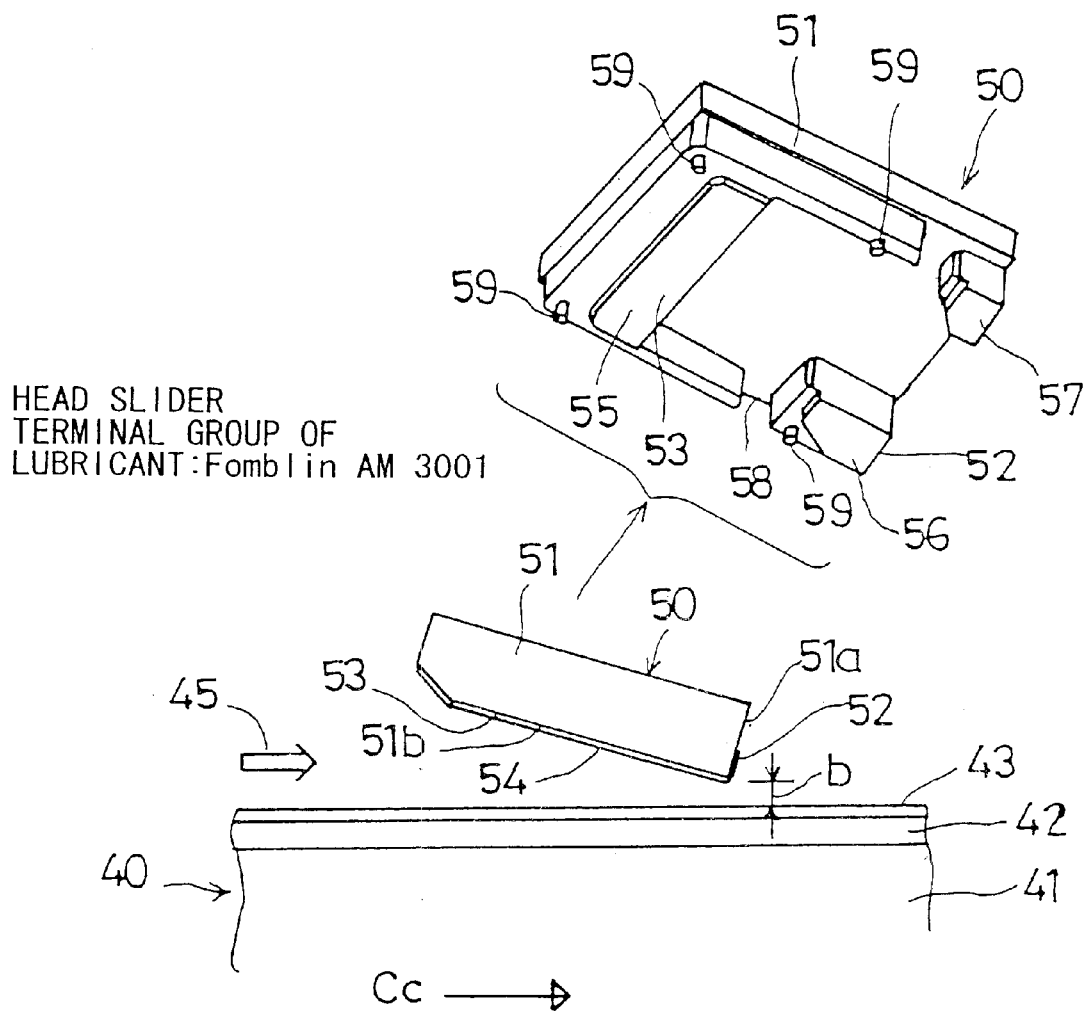
FIG. 3 is an expanded view showing a head slider combined with a hard disk shown in FIG. 2.

FIG. 2 shows a hard disk device 30 according to a first embodiment of the present invention. The hard disk device 30 comprises a box-shaped housing 32 having a base 31 and a cover (not shown) which covers an upper surface of the housing 32. The housing 32 includes a hard disk 40 which rotates counterclockwise at a high speed as indicated by arrow CC in FIG. 2, a carriage 70 which has a head slider 50 at an end thereof, and a If magnetic circuit 80 which rotates the carriage 70 in opposite directions by an electromagnetic force. In FIG. 3, while the head slider 50 is writing or reading-out a record, the hard disk 40 rotates at a high speed and the head slider 50 floats above the hard disk 40 with a distance or height b due to an air flow 45 induced by a high speed rotation of the hard disk 40.

As shown in FIG. 3, the hard disk 40 comprises a magnetic layer 42 on the surface of the substrate 41 and a lubrication layer 43 whose thickness is several nanometers on the surface thereof. In order to decrease the height of the head slider 50 floating above the hard disk 40, a texture treatment is not applied to the substrate 41 so as to make the surface of the hard disk 40 flat and smooth. The lubrication layer 43 is formed by applying a lubricant, and thereafter being processed by UV irradiation.

As shown in FIG. 3, the head slider 50 comprises a head slider body 51 made from ceramics, a magnetic head part 52 formed in the posterior-extremity surface 51a of the head slider body 51, and a lubrication layer 53 on a surface of 51b, which faces the hard disk 40. The head slider 50 has a slider surface 54, which faces the hard disk 40. The lubrication layer 53 is formed by applying a lubricant, and thereafter being processed by UV irradiation.

The slider surface 54 has a floating surface 55 at a front part of the head slider 50. The slider surface 54 also has a couple of floating surfaces 56 and 57 at the rear end of the head slider 50. Moreover, the slider surface 54 has a convexo part 58 in a central part of the head slider 50. While the hard disk 40 rotates at a high speed, a floating force is generated in the head slider 50 by the floating surface 55 at the front part of the head slider 50 and the floating surfaces 56 and 57 at the rear end of the head slider 50. Thus, a negative pressure area is formed in the convexo part 58 in a central part of the head slider 50. The head slider 50 floats in a stable condition.

A convex part 59, which is made of diamond like carbon, is formed on the floating surfaces 55 and 56. During a stop mode of the hard disk 40, the convex part 59 touches the surface of the hard disk 40, and, thus, the floating surfaces 55, 56 and 57 are lifted from the surface of the hard disk 40. Accordingly even though the surface of the hard disk 40 is flat and smooth, the head slider 50 is prevented from adhering the surface of the hard disk 40.

Hereinafter, a structure of the lubricant of the lubrication layer 43 of the hard disk 40 and a structure of the lubricant of the lubrication layer 54 of the head slider 50 will be explained.

A main chain of the lubricant of the lubrication layer 43 of the hard disk 40 is —(CF2–CF20)n-(CF2-0)m-, and a terminal group of the lubricant of the lubrication layer 43 of the hard disk 40 is Fomblin Zdol family(Fomblin Zdol 2000).

Fomblin Zdol family is expressed as a chemical formula showing in FIG. 5-(A).

A main chain of the lubricant of the lubrication layer 54 of the head slider 50 is —(CF2–CF20)n-(CF2-0)m-, and a terminal group of the lubricant of the lubrication layer 54 of the head slider 50 is Fomblin AM 3001 family.

Fomblin AM 3001 is expressed as a chemical formula showing in FIG. 5-(B).

Therefore, the main chain structure of the lubricant of the lubrication layer 43 of the hard disk 40 and the lubricant of the lubrication layer 54 of the head slider 50 have the same structure as —(CF2–CF20)n-(CF2-0)m-. However, the terminal group of the hard disk 40 is Fomblin Zdol family while the terminal group of the head slider 50 is Fomblin AM 3001 family.

The minimum distance of a floating height b of the head slider 50 relative to the surface of the hard disk 40 is smaller than a conventional one by about 0.75 to 1 nanometers. This will be understood from the results of the experiments described below.

The reason for this is considered as follows.

A transfer of the lubricant of the lubrication layer 43 of the hard disk 40 to the head slider 50 is not observed. It is considered that no adhesion force is generated between the lubrication layer 54 of the head slider 50 and the lubrication layer 43 of the hard disk 40, which were close to each other.

In addition, since both the lubrication layer 43 of the hard disk 40 and the lubrication layer 54 of the head slider 50 have no characteristics of generating gas, there is no risk of occurrence of a head crash.

Hereinafter, experiments used as the above-mentioned basis and results of the experiments will be explained.

FIG. 4A is a perspective view showing the experimental equipment 90, which measures the glide height. The glide height is a distance or height from a centrer line of average roughness Ra of a surface of a hard disk to a head slider. The experimental equipment 90 comprises an arm 91, an AE(Acoustic Emission) sensor 92 having a piezo element, a motor 94 that rotates a standard hard disk for the glide height measurement and a hard disk equipped in a hard disk device, and a movement stand 95 that moves in a direction of radius of the hard disk. The arm 91 has a slider part for measurement of the glide height 91b at an end of a gimbal part 91a. A main part side of the arm 91 is mounted on the movement stand 95. The AE sensor 92 is mounted on the main part of the arm 91. The AE sensor 92 detects ultrasonic waves, which are generated by an impact caused by the slider for glide height measurement contacting the hard disk for glide height measurement or a normal hard disk and transfer through the arm 91.

As the hard disks for the experiment, the standard hard disks for the glide height measurement and the normal hard disks were prepared, as shown in FIGS. 4B to 4J.

Each of the standards hard disks for the glide height measurement has many bumps on an upper surface thereof. A plurality of standard hard disks, which have bumps with different heights, were prepared. For example, a standard hard disk 100 has bumps 100a with 3 nm height as shown in FIG. 4B, a standard hard disk 101 has bumps 101a with 5 nm height as shown in FIG. 4C, and a standard hard disk 102 has bumps 102a with 7 nm height as shown in FIG. 4D.

The standard hard disks 100–102 for the glide height measurement were prepared for investigating a relationship between a glide height and a number of rotations of a hard disk.

The normal hard disks were hard disks, which are incorporated in a hard disk device. 5 pieces of normal hard disks with different types of lubricants of a lubrication layer were prepared. The average roughness Ra in a central line of a surface of each of the hard disks was 0.4 nm.

A structure of the main chain of each lubricant was —(CF2–CF20)n-(CF2-0)m-. The structures of the main chains were the same, but the terminal groups were different.

A first hard disk 110 shown in FIG. 4E had a lubrication layer 110a. A structure of a main chain of a lubricant of the lubrication layer 110a was —(CF2–CF20)n-(CF2-0)m-, and a structure of a terminal group of the lubricant of the lubrication layer 110a was Fomblin Zdol family.

A second hard disk 111 shown in FIG. 4F had a lubrication layer 111a. A structure of a main chain of a lubricant of the lubrication layer 111a was —(CF2–CF20)n-(CF2-0)m-, and a structure of a terminal group of the lubricant of a lubrication layer 111a was Fomblin Zdol family with X1P family.

X1P family is expressed as a chemical formula showing in FIG. 5-(F).

A third hard disk 112 shown in FIG. 4G had a lubrication layer 112a. A structure of a main chain of a lubricant of the lubrication layer 112a was —(CF2–CF20)n-(CF2-0)m-, and a structure of a terminal group of the lubricant of the lubrication layer 112a was Fomblin AM 3001 family.

A fourth hard disk 113 shown in FIG. 4H had a lubrication layer 113a. A structure of a main chain of a lubricant of the lubrication layer 113a was —(CF2–CF20)n-(CF2-0)m-, and a structure of a terminal group of the lubricant of the lubrication layer 113a was Amine family.

Amine family is expressed as a chemical formula showing in FIG. 5-(C).

A fifth hard disk 114 shown in FIG. 4I had a lubrication layer 114a. A structure of a main chain of a lubricant of the lubrication layer 114a was —(CF2–CF20)n-(CF2-0)m-, and a structure of a terminal group of the lubricant of the lubrication layer 114a was MORESCO PHOSFANOL family.

MORESCO PHOSFANOL family is expressed as a chemical formula showing in FIG. 5-(D).

A sixth hard disk 115 shown in FIG. 4J had a lubrication layer 115a. A structure of a main chain of a lubricant of the lubrication layer 115a was —(CF2–CF20)n-(CF2-0)m-, and a structure of a terminal group of the lubricant of the lubrication layer 115a was Fomblin Tetraol family.

Fomblin Tetraol family is expressed as a chemical formula showing in FIG. 5-(E).

Six types of the head sliders for the glide height measurement shown in FIGS. 4K-4P were prepared.

A slider surface of each of the head sliders for the glide height measurement had rails on both sides thereof.

A first head slider 120 shown in FIG. 4K had a lubrication layer 120a. A structure of a main chain of a lubricant of the lubrication layer 120a was —(CF2–CF20)n-(CF2-0)m-, and a structure of a terminal group of the lubricant of the lubrication layer 120a was Fomblin Zdol family.

A second head slider 121 shown in FIG. 4L had a lubrication layer 121a. A structure of a main chain of a lubricant of the lubrication layer 121a was —(CF2–CF20) n-(CF2-0)m-, and a structure of a terminal group of the lubricant of the lubrication layer 121a was Fomblin AM 3001 family.

A third head slider 122 shown in FIG. 4M had a lubrication layer 122a. A structure of a main chain of a lubricant of the lubrication layer 122a was —(CF2–CF20)n-(CF2-0) m-, and a structure of a terminal group of the lubricant of the lubrication layer 122a was Amine family.

A fourth head slider 123 shown in FIG. 4N had a lubrication layer 123a. A structure of a main chain of a lubricant of the lubrication layer 123a was —(CF2–CF20) n-(CF2-0)m-, and a structure of a terminal group of the lubricant of the lubrication layer 123a was MORESCO PHOSFANOL family.

A fifth head slider 124 shown in FIG. 4O had a lubrication layer 124a. A structure of a main chain of a lubricant of the lubrication layer 124a was —(CF2–CF20)n-(CF2-0)m-, and a structure of a terminal group of the lubricant of the lubrication layer 124a was Fomblin Tetraol family.

A sixth head slider 125 shown in FIG. 4P did not have a lubrication layer.

The experiments were performed as follows. The first step was (1) to investigate a relationship between a glide height and a number of rotations of the hard disk. Then, the next step was (2) to find a glide height.

(1) Steps to investigate a relationship between a glide height and a number of rotations of the hard disk:

The sixth head slider 125 was fixed to a gimbal part of the arm 91. The standard hard disk 100 was fixed to the motor 94, and rotated at a high speed. The number of rotations of the standard hard disk 100 was gradually decreased, and the number of rotations of the standard hard disk 100 was recorded when the head slider 124 touched the bump 110a and the AE sensor 92 outputted a signal. By moving the movement stand 95, the head slider 124 was moved to a different radial position on the standard hard disk 100 so as to perform the above-mentioned operation. Thereby, the rotating speed was detected, when the glide height was 3 nm, at several positions of the radius.

The standard hard disk 100 was removed, then the above-mentioned operation was performed with the standard hard disk 101. Thereby, the rotating speed when the glide height was 5nm was detected at several positions of the radius.

The standard hard disk 101 was removed, then the above-mentioned operation was performed with the standard hard disk 102. Thereby, the rotating speed when the glide height was 7nm was detected at several positions of the radius.

A table, which shows a relationship between a glide height and a speed of the hard disk, was obtained by the above-mentioned operations.

(2) Steps to find a glide height:

The standard hard disk 101 was removed, then the first hard disk 110 shown in FIG. 4E was attached to the experimental device. Instead of the sixth head slider 125, the first head slider 120 shown in FIG. 4K was fixed to the gimbal part of the arm 91.

The main chain of the lubrication layer 110a of the first hard disk 110 had the same structure as the main chain of the lubrication layer 120a of the first head slider 120 in the form of —(CF2–CF20)n-(CF2-0)m-. In addition, the terminal group of the lubrication layer 110a of the first hard disk 110 had the same structure as the terminal group of the lubrication layer 120a of the first head slider 120 in the form of Fomblin Zdol family.

Figure 6:
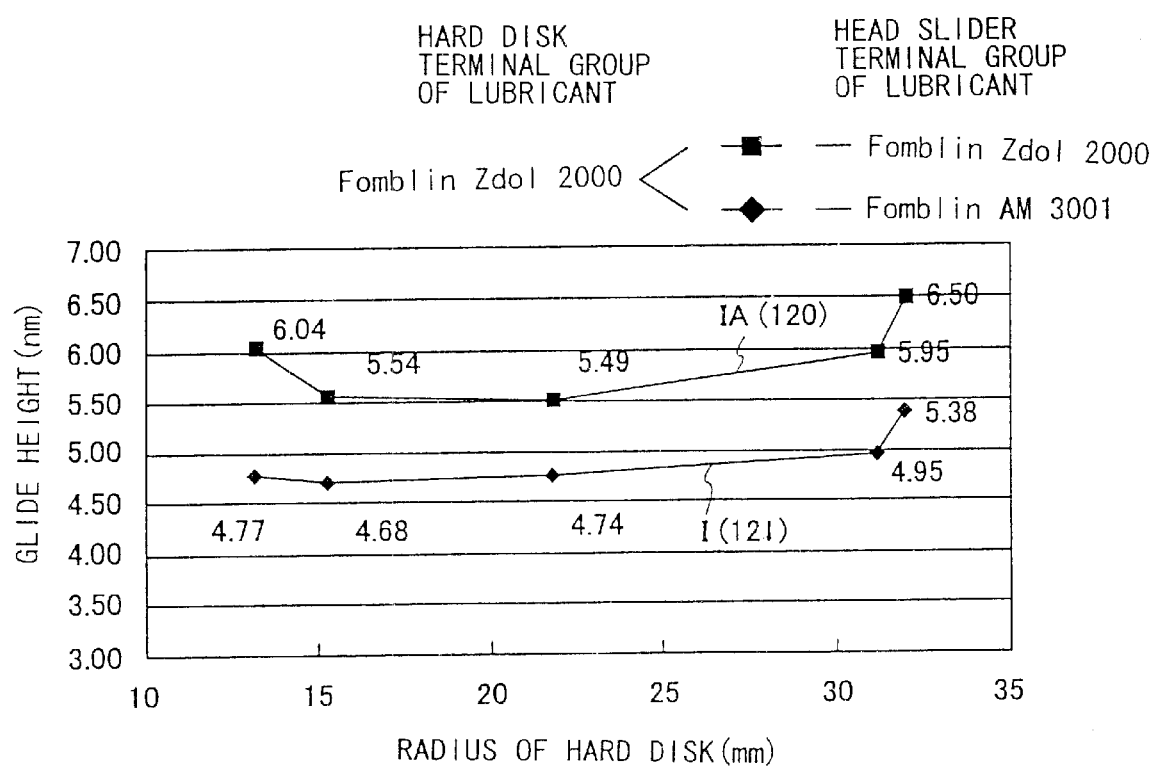
FIG. 6 is a graph showing a change in a glide height of first and second head sliders with respect to a first hard disk.

The first hard disk 110 was rotated at a high speed. Then, the number of rotations of the first hard disk 110 was gradually decreased. Also, the number of rotations of the first hard disk 110 was recorded when the first head slider 120 touched the surface of the first hard disk 110 and the AE sensor 92 outputted a signal. By moving the movement stand 95, the head slider 120 was moved to a different radial position of the first hard disk 110 so as to be performed the above-mentioned recording step. Thus, a glide height can be detected by applying the number of rotations of the first hard disk 110 when AE sensor outputted a signal to the above-mentioned table. A line IA in FIG. 6 shows the obtained glide height. When the glide height was obtained at a radial position of 22 mm, the glide height was 5.49 nm.

Then, instead of the first head slider 120, the second head slider 121 shown in FIG. 4L was mounted to the gimbal part of the arm 91 in the experimental equipment.

By replacing the head slider, the terminal group of the lubrication layer 110a of the first hard disk 110 and the terminal group of the lubrication layer 121a of the first head slider 121 were in the different forms of Fomblin Zdol family and Fomblin AM 3001 family, respectively. However, both the main chain of the lubrication layer 110a of the first hard disk 110 and the lubrication layer 121a of the first head slider 121 had the same structure as —(CF2–CF20)n-(CF2-0)m-.

In this state, similar to the above-mentioned steps, the first hard disk 110 was rotated at a high speed. Then, the number of rotations of the first hard disk 110 was gradually decreased. Also, the number of rotations of the first hard disk 110 was recorded when the second head slider 121 touched the surface of the first hard disk 110 and the AE sensor 92 outputted a signal. By moving the movement stand 95, the second head slider 121 was moved to a different radial position of the first hard disk 110 so as to perform the above-mentioned recording steps. Thus, the glide height was detected by applying the number of rotations of the first hard disk 110 when the AE sensor outputted a signal to the above-mentioned table. A line I in FIG. 6 shows obtained glide height. When the glide height was obtained at a radial position of 22 mm, the number of rotations of the first hard disk 110 was decreased and became around 1500 rpm. Then, the AE sensor outputted a signal due to a contact of the second head slider 121 to the surface of the first hard disk 110. The glide height was 4.74 nm and lower than 0.77 nm compared to the example of the first head slider 120.

Comparing the line I in FIG. 6 with the line IA in FIG. 6, the glide height was reduced by 0.75 to 1.27 nm due to the change from a state in which the terminal groups of the lubricants of the lubrication layers, which faces each other, have the same structure of Fomblin Zdol family to a state in which the terminal groups have different structures of Fomblin Zdol family and Fomblin AM 3001 family.

Second Embodiment

Figure 7:
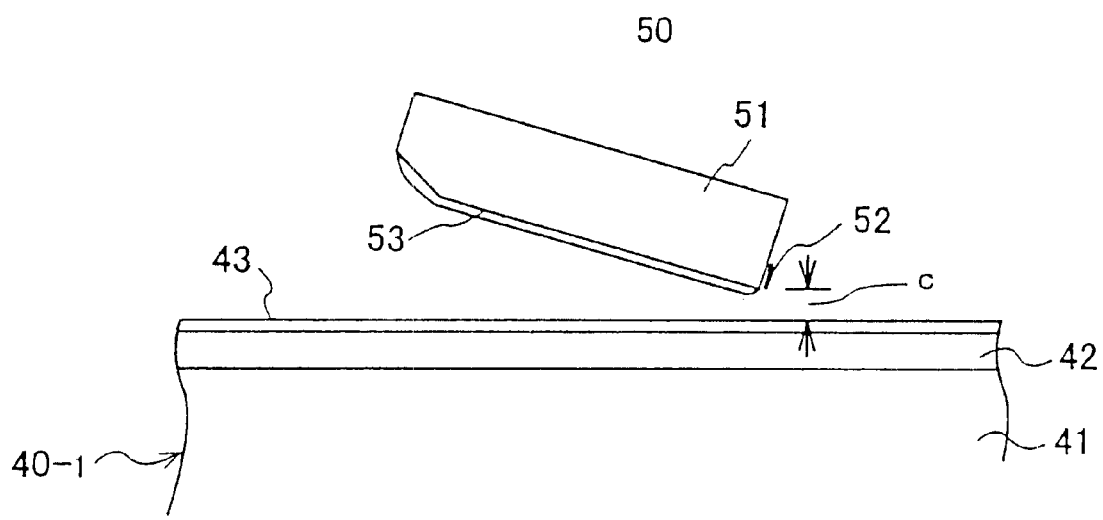
FIG. 7 is a side view of a part of a hard disk device according to a second embodiment of the present invention.

FIG. 7 is a side view of a part of a hard disk device 30-1 according to a second embodiment of the present invention.

Comparing with the hard disk device 30 shown in FIG. 3, the hard disk device 30-1 has the same head slider as the head slider 50 shown in FIG. 3, and a hard disk 40-1 has a different structure compared to the hard disk 40 shown in FIG. 3.

The difference between the hard disk 40-1 and the above-mentioned hard disk 40 is in a lubrication layer 43-1. A structure of the main chain of the lubricant of the lubrication layer 43-1 is —(CF2–CF20)n-(CF2-0)m-, and a structure of the terminal group of the lubricant of the lubrication layer 43-1 is Fomblin Zdol family with X1P family.

Therefore, the structure of the main chain of the lubricant of the lubrication layer 43-1 of the hard disk 40-1 and the lubricant of the lubrication layer 53 of the head slider 50 are in the same form of —(CF2–CF20)n-(CF2-0)m-. However, the terminal group of the lubricant of the lubrication layer 43-1 of the hard disk 40-1 is Fomblin Zdol family+X1P family, and the terminal group of the lubricant of the lubrication layer 53 art of the head slider 50 is Fomblin AM 3001 family.

The minimum floating height c of the head slider 50 from a surface of the hard disk 40 is reduced by more than 1 nm as compared to the conventional one. This will be understood from the results of the experiments described below.

The second hard disk 111 shown in FIG. 4F and the second head slider 121 shown in FIG. 4L were mounted to the experimental equipment in FIG. 4A. Then the experiment was performed with above-mentioned equipment. The second hard disk 111 was rotated at a high speed. The second head slider 121 was positioned at 22 mm of radius of the second hard disk 111. Then, the number of rotations of the second hard disk 111 was decreased gradually. Even though the number of rotations of the second hard disk 111 dropped and became 1000 rpm, no signal was outputted from the AE sensor 92. The glide height was too low to be detected by the above-mentioned experimental equipment.

Third Embodiment

Figure 8:
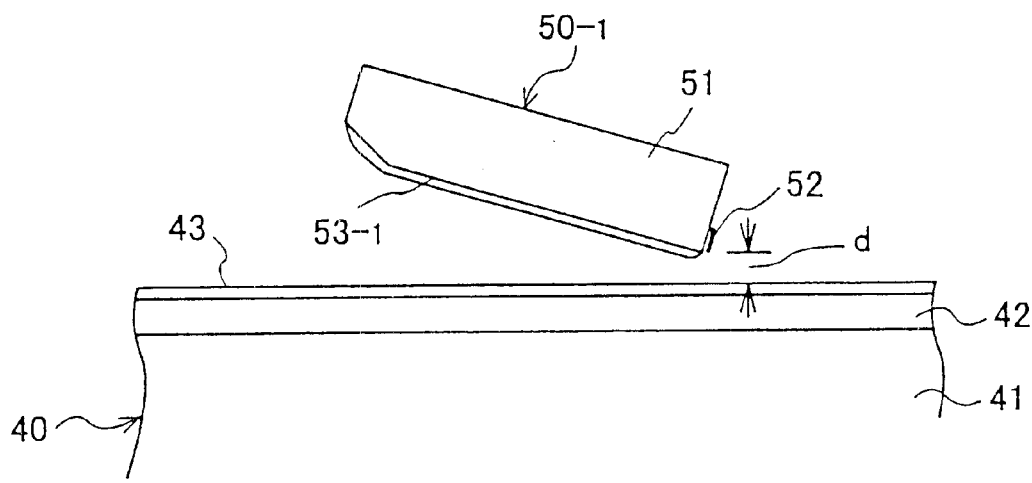
FIG. 8 is a side view of a part of a hard disk device according to a third embodiment of the present invention.

FIG. 8 is a side view of a part of the hard disk device 30-2 according to a third embodiment of the present invention.

Comparing with the hard disk device 30 shown in FIG. 3, the hard disk device 30-2 has the same hard disk as the hard disk 40 shown in FIG. 3, and a head slider 50-1 has a different structure compared to the head slider 50 shown in FIG. 3.

The difference between the head slider 501 and the above-mentioned head slider 50 is in a lubrication layer 53-1. A structure of the main chain of the lubricant of the lubrication layer 53-1 is —(CF2–CF20)n-(CF2-0)m-, and a structure of the terminal group of the lubricant of the lubrication layer 53-1 is Amine family.

Therefore, the structure of the main chain of the lubricant of the lubrication layer 43 of the hard disk 40 and the lubricant of the lubrication layer 53-1 of the head slider 50-1 are in the same form of —(CF2–CF20)n-(CF2-0)m-. However, the terminal group of the lubricant of the lubrication layer 43 of the hard disk 40 is Fomblin Zdol family, and the terminal group of the lubricant of the lubrication layer 53-1 of the head slider 50-1 is Amine family.

The minimum floating height d of the head slider 50-1 from a surface of the hard disk 40 is reduced by 0.15 to 0.59 nm as compared to the conventional one. This will be understood from the results of the experiments described below.

The first hard disk 110 shown in FIG. 4E and the first head slider 120 shown in FIG. 4K were mounted to the experimental equipment in FIG. 4A. Then the glide height was obtained with above-mentioned equipment using the same operations as before. In this case, a structure of the main chain of the lubricant of the first hard disk 110 and the lubricant of the first head slider 120 were the same structure. In addition, both the terminal group of the first hard disk 110 and the first head slider 120 had the same structure in the form of Fomblin Zdol 2000. A line IIA in FIG. 9 shows the obtained glide height.

Then, instead of the first head slider 120, the third head slider 122 shown in FIG. 4M was mounted to the experimental equipment. Thus, the glide height was obtained with same operations as above-mentioned. By replacing the head slider, the terminal group of the lubricant of the first hard disk 110 and the terminal group of the lubricant of the third head slider 122 were in the different forms of Fomblin Zdol 2000 and Amine family, respectively. A line II in FIG. 9 shows the obtained glide height.

Figure 9:
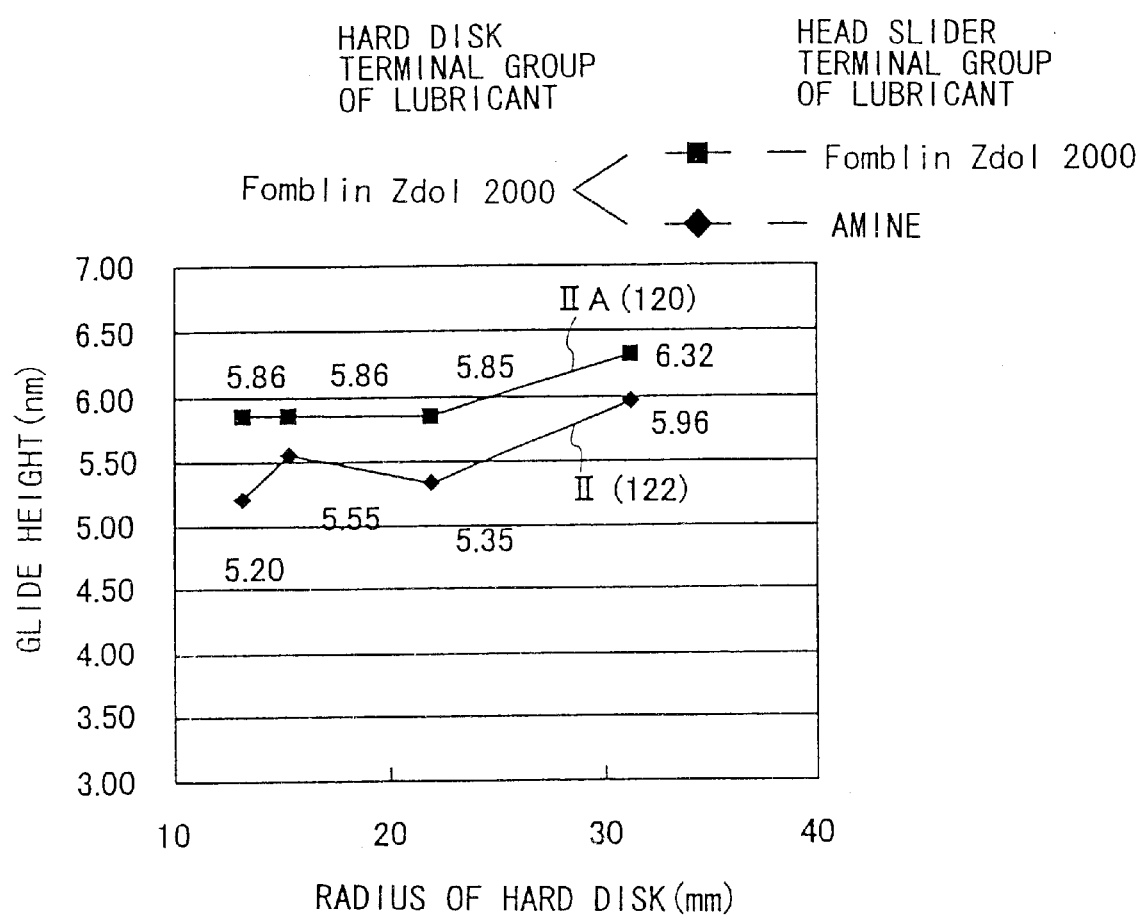
FIG. 9 is a graph showing a change in a glide height of first and third head sliders with respect to the first hard disk.

Comparing the line II in FIG. 9 with the line IIA in FIG. 9, the glide height was reduced by 0.15 to 0.59 nm due to the change from a state in which the terminal groups of the lubricants of the lubrication layers, which faces each other, have the same structure of Fomblin Zdol family to a state in which the terminal groups have different structures of Fomblin Zdol family and Fomblin AM 3001 family.

Fourth Embodiment

Figure 10:
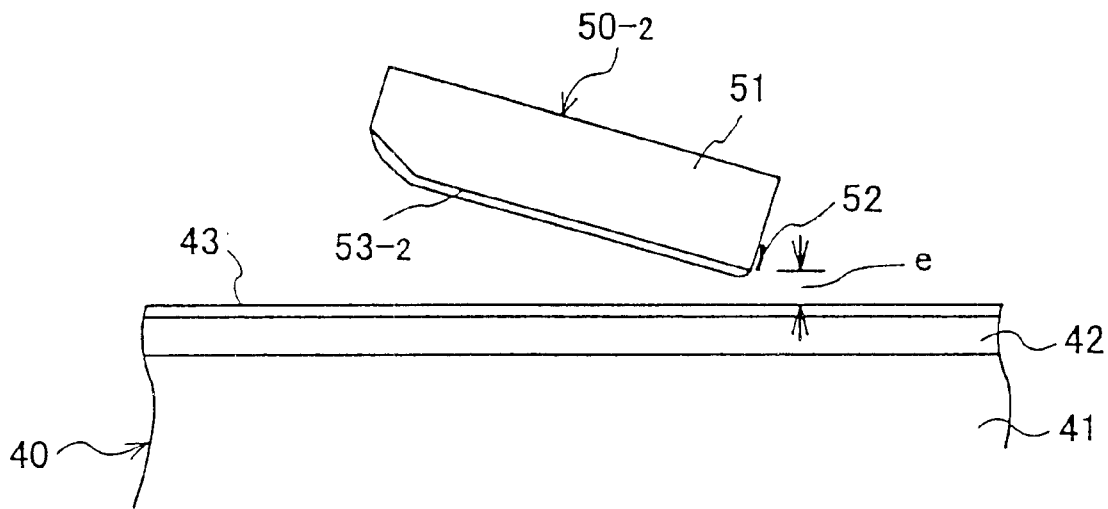
FIG. 10 is a side view of a part of a hard disk device according to a fourth embodiment of the present invention.

FIG. 10 is a side view of a part of hard disk device 30-3 according to a fourth embodiment of the present invention.

Comparing with the hard disk device 30 shown in FIG. 3, the hard disk device 30-3 has the same hard disk as the hard disk 40 shown in FIG. 3, and a head slider 50-2 has a different structure as compared to the head slider 50 shown in FIG. 3.

The difference between the head slider 50-2 and the above-mentioned head slider 50 is in a lubrication layer 53-2. A structure of the main chain of the lubricant of the lubrication layer 53-2 is —(CF2–CF20)n-(CF2-0)m-, and a structure of the terminal group of the lubricant of the lubrication layer 53-2 is Fomblin Tetraol family.

Therefore, the structure of the main chain of the lubricant of the lubrication layer 43 of the hard disk 40 and the lubricant of the lubrication layer 53-2 of the head slider 50-2 are in the same form of —(CF2–CF20)n-(CF2-0)m-. However, the terminal group of the lubricant of the lubrication layer 43 of the hard disk 40 is Fomblin Zdol 2000, and the terminal group of the lubricant of the lubrication layer 53-2 of the head slider 50-2 is Fomblin Tetraol family.

The minimum distance of the floating height e of the head slider 50-2 from a surface of the hard disk 40 is reduced by 0.29 to 0.75 nm as compared to the conventional one. This will be understood from the results of the experiments described below.

The first hard disk 110 shown in FIG. 4E and the first head slider 120 shown in FIG. 4K were mounted to the experimental equipment in FIG. 4A. Then the glide height was obtained with the above-mentioned equipment using the same operations as before. In this case, a structure of the main chain of the lubricant of the first hard disk 110 and the lubricant of the first head slider 120 were the same structure. In addition, both the terminal group of the first hard disk 110 and the first head slider 120 had the same structure in the form of Fomblin Zdol 2000. A line IIIA in FIG. 11 shows the obtained glide height.

Then, instead of the first head slider 120, the fifth head slider 124 in FIG. 4O was mounted to the experimental equipment. Thus, the glide height was obtained with same operations as above-mentioned. By replacing the head slider, the terminal group of the lubricant of the first hard disk 110 and the terminal group of the lubricant of the fifth head slider 124 were in the different forms of Fomblin Zdol 2000 and Fomblin Tetraol, respectively. A line III in FIG. 11 shows the obtained glide height.

Figure 11:
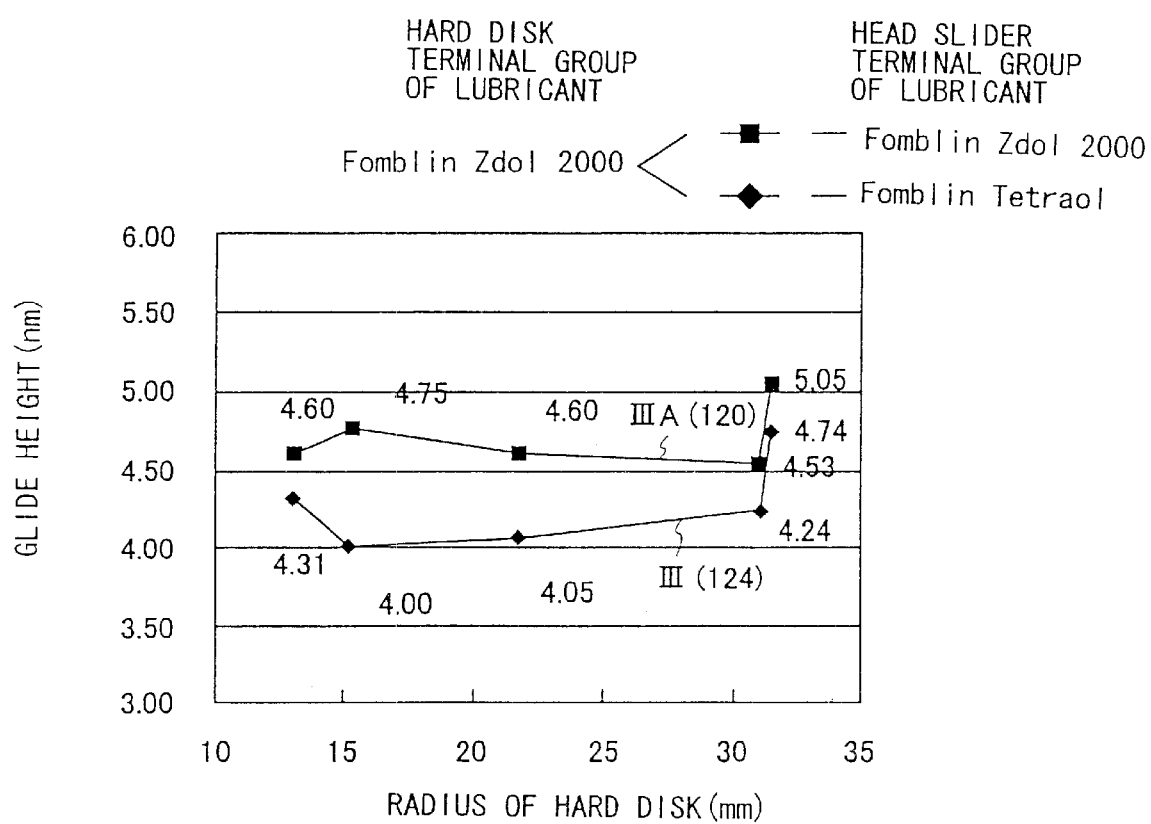
FIG. 11 is a graph showing a change in a glide height of first and fifth head sliders with respect to the first hard disk.

Comparing the line III in FIG. 11 with the line IIIA in FIG. 11, the glide height was reduced by 0.29 to 0.75 nm due to the change from a state in which the terminal groups of the lubricants of the lubrication layers, which faces each other, have the same structure of Fomblin Zdol family to a state in which the terminal groups have different structures of Fomblin Zdol family and Fomblin Tetraol.

Fifth Embodiment

Figure 12:
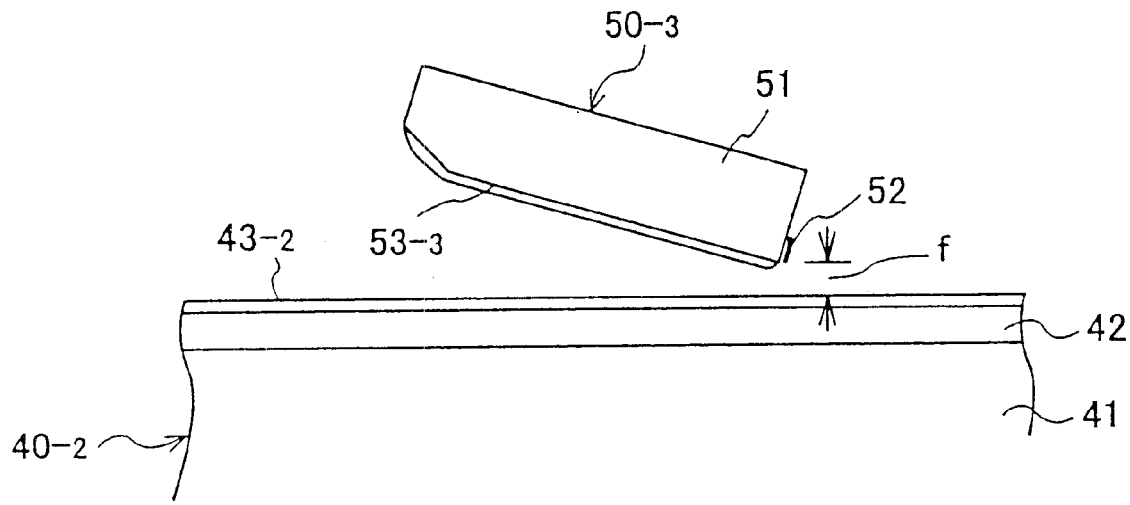
FIG. 12 is a side view of a part of a hard disk device according to a fifth embodiment of the present invention.

FIG. 12 is a side view of a part of a hard disk device 30-4 according to a fifth embodiment of the present invention.

Comparing with the hard disk device 30 shown in FIG. 3, the hard disk device 30-4 has a different head slider 50-3 and a different hard disk 40-2 from the above-mentioned head slider 50 and the hard disk 40.

The difference between the head slider 50-3 and the above-mentioned head slider 50 is in a lubrication layer 53-3. A structure of the main chain of the lubricant of the lubrication layer 53-3 is —(CF2–CF20)n-(CF2-0)m-, and a structure of the terminal group of the lubricant of the lubrication layer 53-3 is Fomblin Zdol 2000.

The difference between the hard disk 40-2 and the above-mentioned hard disk 40 is in a lubrication layer 43-2. A structure of the main chain of the lubricant of the lubrication layer 43-2 is —(CF2–CF20)n-(CF2-0)m-, and a structure of the terminal group of the lubricant of the lubrication layer 43-2 is Fomblin AM 3001.

Therefore, the structure of the main chain of the lubricant of the lubrication layer 43-2 of the hard disk 40-2 and the lubricant of the lubrication layer 53-3 of the head slider 50-3 are in the same form of —(CF2–CF20)n-(CF2-0)m-. However, the terminal group of the lubricant of the lubrication layer 43-2 of the hard disk 40-2 is Fomblin AM 3001, and the terminal group of the lubricant of the lubrication layer 53-3 of the head slider 50-3 is Fomblin Zdol 2000. Thus, the fifth embodiment has the opposite relationship with respect to the terminal groups of the hard disk and the head slider in the first embodiment as shown in FIG. 3.

The minimum floating height f of the head slider 50-3 from a surface of the hard disk 40-2 is reduced by 0.15 to 0.59 nm as compared to the conventional one. This will be understood from the results of the experiments described below.

The third hard disk 112 shown in FIG. 4G and the second head slider 121 shown in FIG. 4L were mounted to the experimental equipment in FIG. 4A. Then the glide height was obtained with above-mentioned equipment using the same operations as before. In this case, a structure of the main chain of the lubricant of the third hard disk 112 and the lubricant of the second head slider 121 were the same structure. In addition, both the terminal group of the third hard disk 112 and the second head slider 121 had the same structure in the form of Fomblin AM 3001. A line IVA in FIG. 13 shows the obtained glide height.

Then, instead of the second head slider 121, the first head slider 120 shown in FIG. 4K was mounted to the experimental equipment. Thus, the glide height was obtained with same operations as above-mentioned. By replacing the head slider, the terminal group of the lubricant of the third hard disk 112 and the terminal group of the lubricant of the first head slider 120 were in the different forms of Fomblin AM 3001 and Fomblin Zdol 2000, respectively. The fifth embodiment has a relationship, which the terminal groups of the hard disk and the head slider are different structures. A line IV in FIG. 13 shows the obtained glide height.

Figure 13:
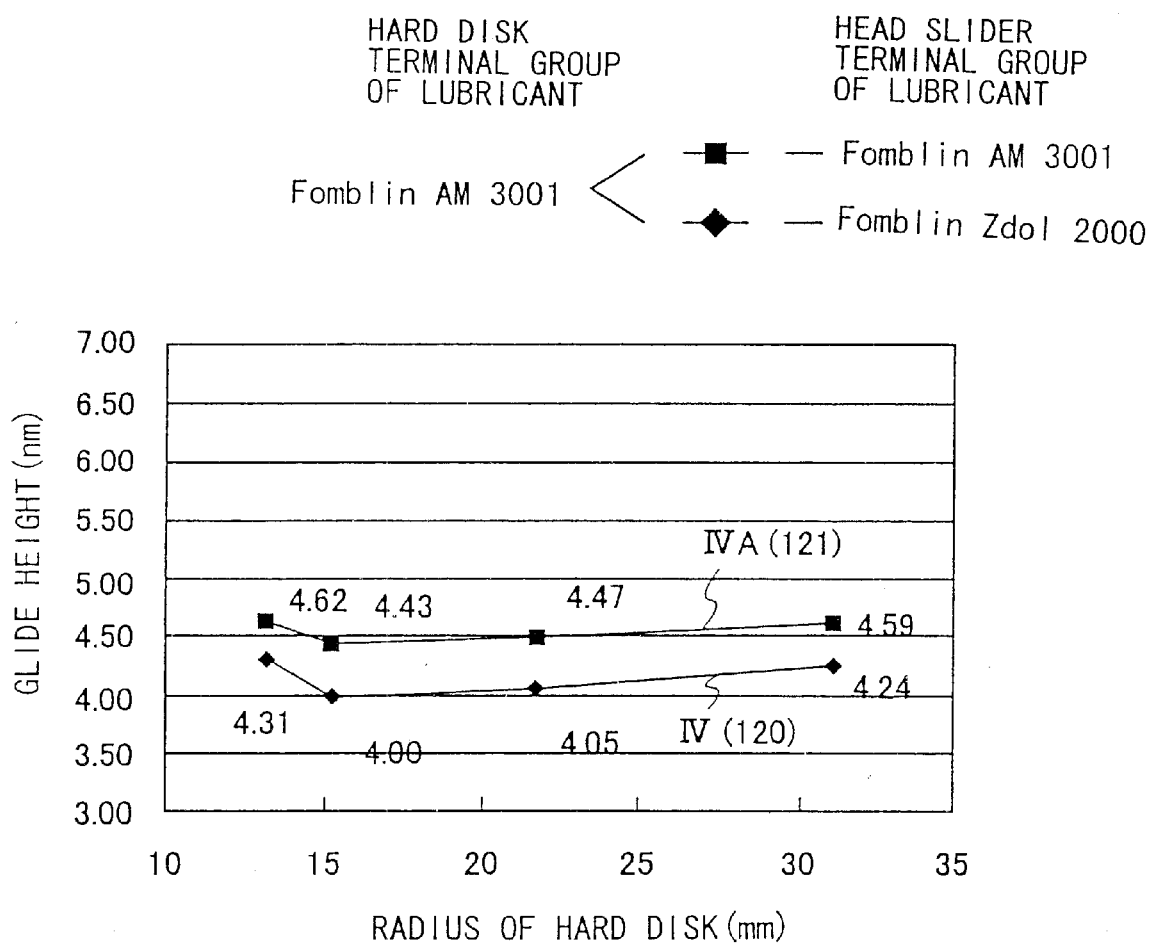
FIG. 13 is a graph showing a change in a glide height of first and second head sliders with respect to a third hard disk.

Comparing the line IV in FIG. 13 with the line IVA in FIG. 13, the glide height was reduced by 0.15 to 0.59 nm due to the change from a state in which the terminal groups of the lubricants of the lubrication layers, which faces each other, have the same structure of Fomblin AM 3001 family to a state in which the terminal groups have different structures of Fomblin AM 3001 family and Fomblin Zdol family.

Sixth Embodiment

Figure 14:
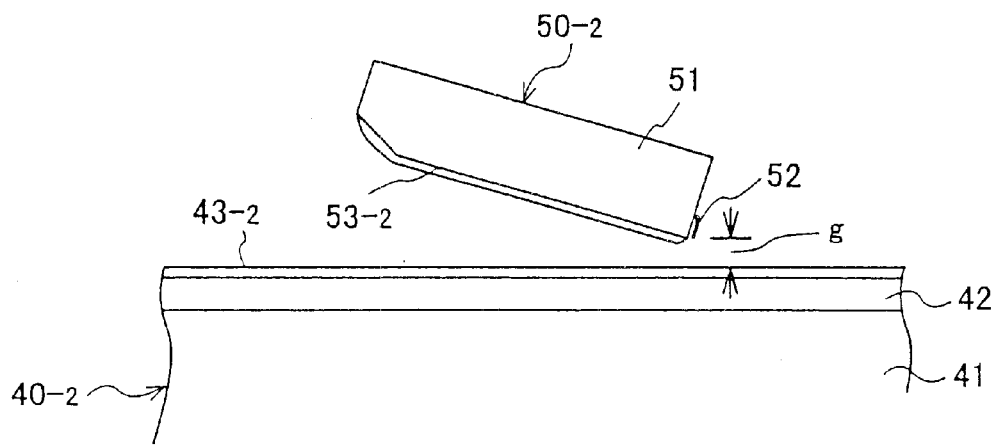
FIG. 14 is a side view of a part of a hard disk device according to a sixth embodiment of the present invention.
Figure 15:
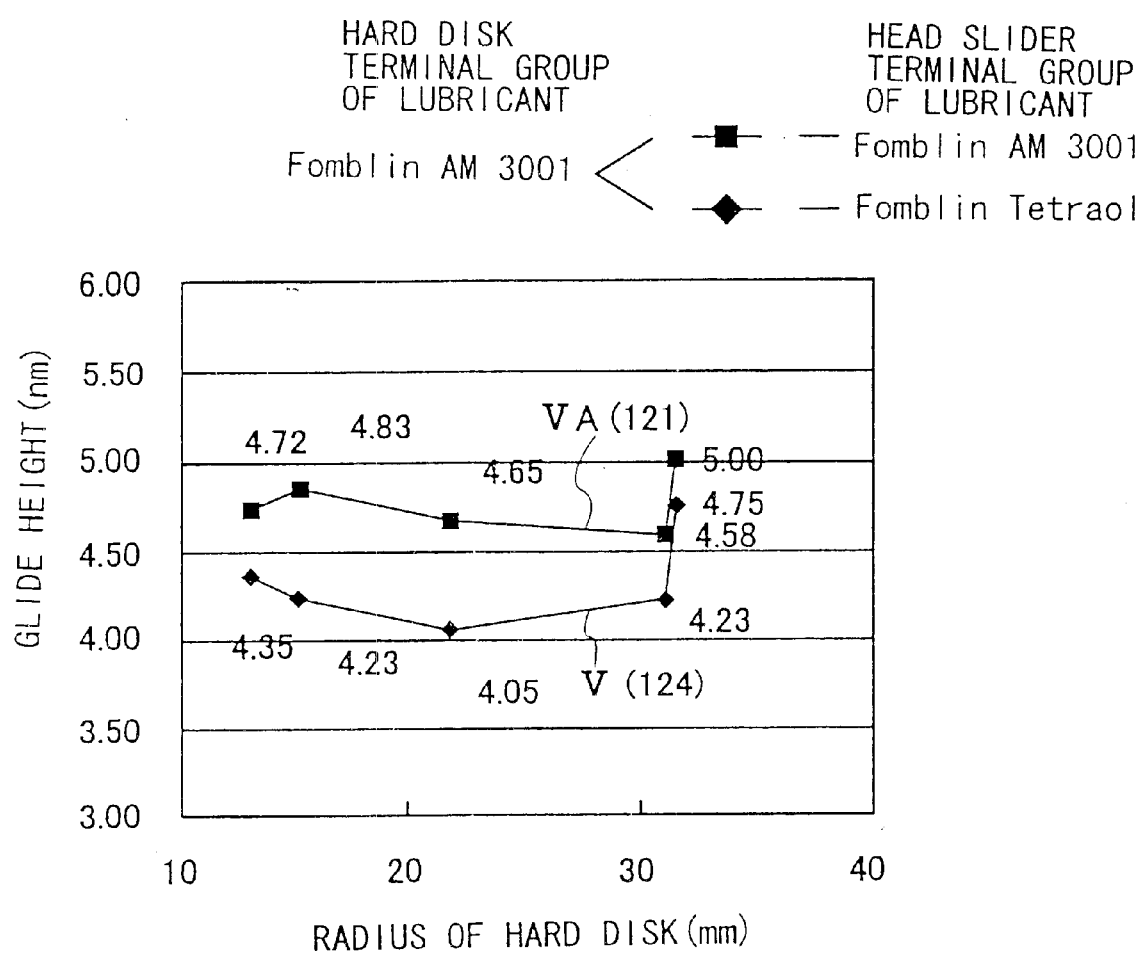
FIG. 15 is a graph showing a change in a glide height of second and fifth head sliders with respect to the third hard disk.

FIG. 14 is a side view of a part of a hard disk device 30-5 according to a sixth embodiment of the present invention.

Comparing with the hard disk device 30 shown in FIG. 3, the hard disk device 30-5 has the different head slider 50-2 and the different hard disk 40-2 from the above-mentioned head slider 50 and the hard disk 40.

The difference between the head slider 502 and the above-mentioned head slider 50 is in a lubrication layer 53-2. A structure of the main chain of the lubricant of the lubrication layer 53-2 is —(CF2–CF20)n-(CF2-0)m-, and the structure of the terminal group of the lubricant of a lubrication layer 53-2 is Fomblin Tetraol.

The difference between the hard disk 40-2 and the above-mentioned hard disk 40 is in a lubrication layer 43-2. A structure of the main chain of the lubricant of the lubrication layer 43-2 is —(CF2–CF20)n-(CF2-0)m-, and the structure of the terminal group of the lubricant of the lubrication layer 43-2 is Fomblin AM 3001.

Therefore, the structure of the main chain of the lubricant of the lubrication layer 43-2 of the hard disk 40-2 and the lubricant of the lubrication layer 53-2 of the head slider 50-2 are in the same form of —(CF2–CF20)n-(CF2-0)m-. However, the terminal group of the lubricant of the lubrication layer 43-2 of the hard disk 40-2 is Fomblin AM 3001, and the terminal group of the lubricant of the lubrication layer 53-2 of the head slider 50-2 is Fomblin Tetraol.

The minimum floating height g of the head slider 50-2 from a surface of the hard disk 40-2 is reduced by 0.25 to 0.60 nm as compared to the conventional one. This will be understood from the results of the experiments described below.

The third hard disk 112 shown in FIG. 4G and the second head slider 121 shown in FIG. 4L were mounted to the experimental equipment in FIG. 4A. Then the glide height was obtained with above-mentioned equipment using the same operations as before. The structure of the main chain of the lubricants of the third hard disk 112 and the lubricants of the second head slider 121 were the same structure. In addition, both the terminal group of the third hard disk 112 and the second head slider 121 had the same structure in the form of Fomblin AM 3001. A line VA in FIG. 14 shows the obtained glide height.

Then, instead of the second head slider 121, the fifth head slider 124 shown in FIG. 4O was mounted to the experimental equipment. Thus, the glide height was obtained with same operations as above-mentioned. By replacing the head slider, the terminal group of the lubricant of the third hard disk 112 and the terminal group of the lubricant of the fifth head slider 124 were in the different forms of Fomblin AM 3001 and Fomblin Tetraol, respectively. The sixth embodiment has a relationship, which the terminal groups of the hard disk and the head slider are different structures. A line V in FIG. 14 shows the obtained glide height.

Comparing the line V in FIG. 14 with the line VA in FIG. 14, the glide height was reduced by 0.25 to 0.60 nm due to the change from a state in which the terminal groups of the lubricants of the lubrication layers, which faces each other, have the same structure of Fomblin AM 3001 family to a state in which the terminal groups have different structures of Fomblin AM 3001 family and Fomblin Tetraol.

Seventh Embodiment

Figure 16:
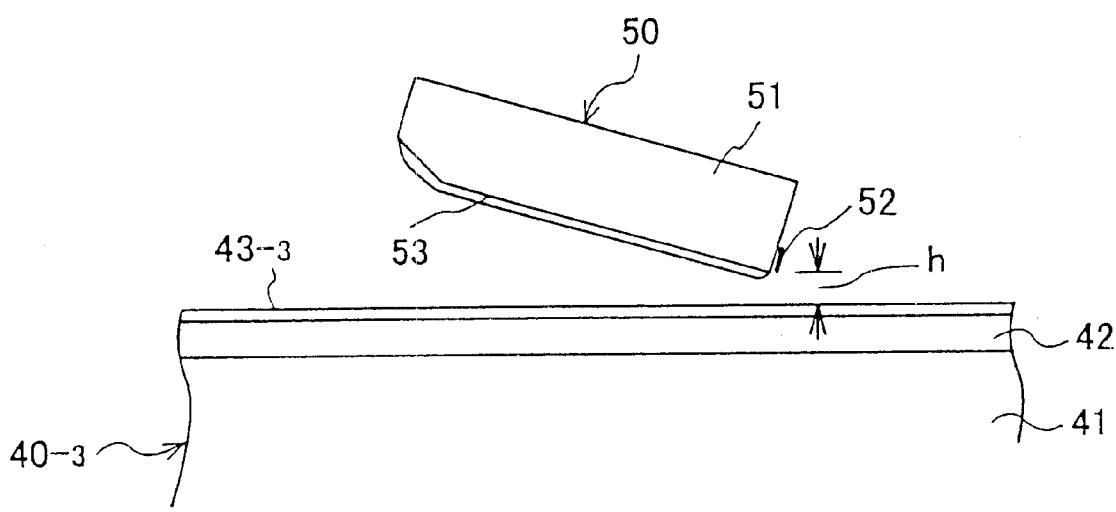
FIG. 16 is a side view of a part of a hard disk device according to a seventh embodiment of the present invention.

FIG. 16 is a side view of a part of a hard disk device 30-6 according to a seventh embodiment of the present invention.

Comparing with the hard disk device 30 shown in FIG. 3, the hard disk device 30-6 has a structurally different hard disk 40-3 from the above-mentioned hard disk 40.

The difference between the hard disk 40-3 and the above-mentioned hard disk 40 is in a lubrication layer 43-3. A structure of the main chain of the lubricant of the lubrication layer 43-3 is —(CF2–CF2O)n-(CF2-0)m-, and a structure of the terminal group of the lubricant of the lubrication layer 43-3 is Amine family.

Therefore, the structure of the main chain of the lubricant of the lubrication layer 43-3 of the hard disk 40-3 and the lubricant of the lubrication layer 53 of the head slider 50 are in the same form of —(CF2–CF2O)n-(CF2-0)m-. However, the terminal group of the lubricant of the lubrication layer 43-3 of the hard disk 40-3 is Amine family, and the terminal group of the lubricant of the lubrication layer 53 of the head slider 50 is Fomblin Zdol 2000.

The minimum floating height h of the head slider 50 from a surface of the hard disk 40-3 is reduced by 0.37 to 0.54 nm as compared to the conventional one. This will be understood from the results of the experiments described below.

The fourth hard disk 113 shown in FIG. 4H and the third head slider 122 shown in FIG. 4M were mounted to the experimental equipment in FIG. 4A. Then the glide height was obtained with above-mentioned equipment using the same operations as before. The structure of the main chain of the lubricant of the fourth hard disk 113 and the lubricant of the third head slider 122 were the same structure. In addition, both the terminal group of the fourth hard disk 113 and the third head slider 122 had the same structure in the form of Amine family. A line VIA in FIG. 17 shows the obtained glide height.

Then, instead of the third head slider 122, the first head slider 120 shown in FIG. 4K was mounted to the experimental equipment. Thus, the glide height was obtained with same operations as above-mentioned. By replacing the head slider, the terminal group of the lubricant of the fourth hard disk 113 and the terminal group of the lubricant of the first head slider 120 are in the different forms of Amine family and Fomblin Zdol 2000, respectively. The seventh embodiment has a relationship, which the terminal groups of the hard disk and the head slider are different structures. A line VI in FIG. 17 shows the obtained glide height.

Figure 17:
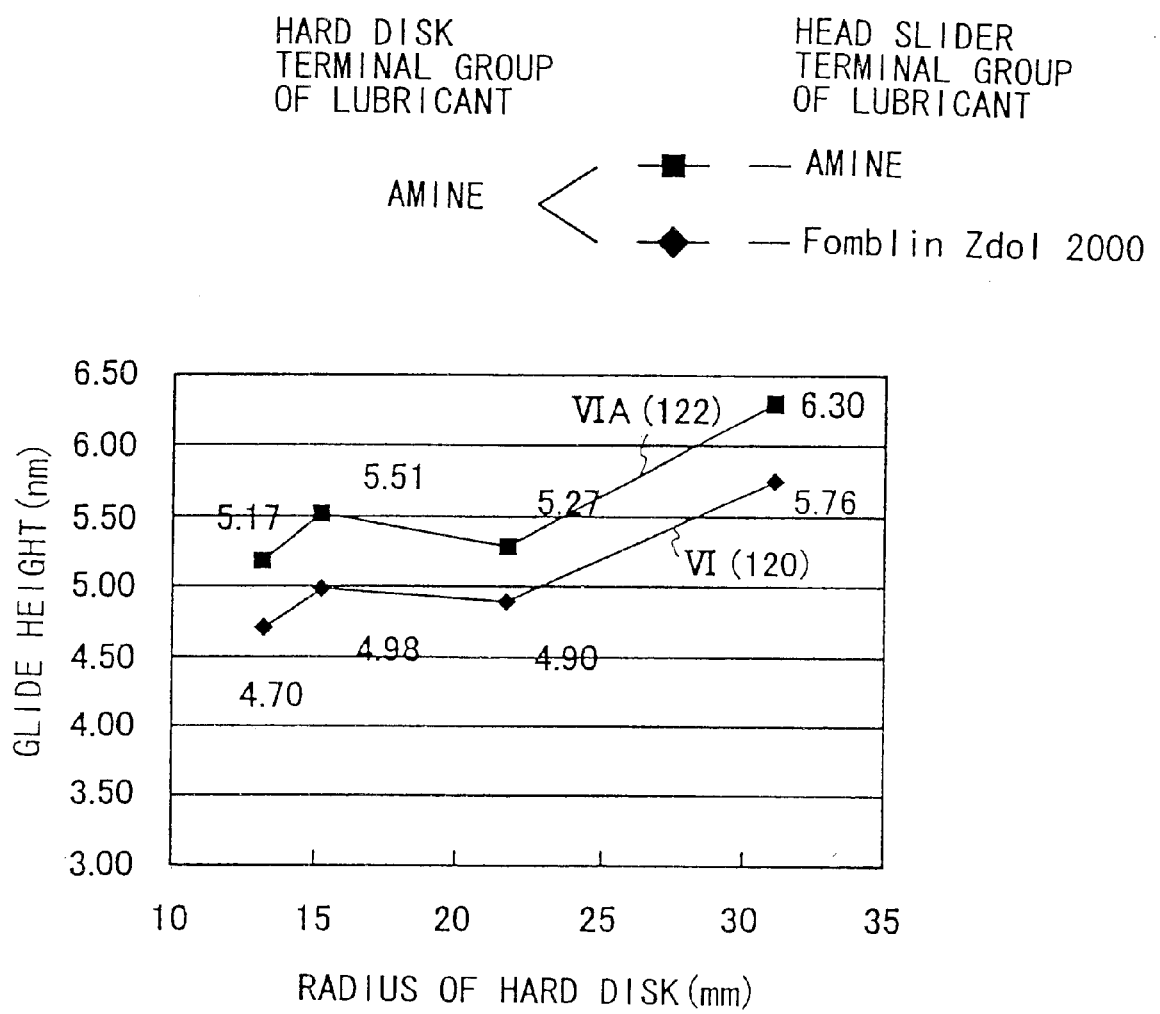
FIG. 17 is a graph showing a change in a glide height of first and third head sliders with respect to a fourth hard disk.

Comparing the line VI in FIG. 17 with the line VIA in FIG. 17, the glide height was reduced by 0.37 to 0.54 nm due to the change from a state in which the terminal groups of the lubricants of the lubrication layers, which faces each other, have the same structure of Fomblin AM 3001 family to a state in which the terminal groups have different structures of Fomblin AM 3001 family and Fomblin Zdol 2000.

FIG. 18 is a table showing the numerical data of the graph of the above-mentioned FIGS. 6, 9, 11, 13, 15, and 17.

It is possible to decrease a glide height by means of not only the above-mentioned combination in the first to seventh embodiments but also any different combination of a lubricant of a head slider and a lubricant of a hard disk.

The present invention is not limited to the specifically disclosed embodiments, and variations and modifications may be made without departing from the scope of the present invention.

The present application is based on Japanese priority application No.2001-181916 filed on Jun. 15, 2001, the entire contents of which are hereby incorporated by reference.

What is claimed is:

1. A head slider for recording and playing back signals on a medium while floating on the medium, comprising:

a head slider body; and a lubrication layer on a slider surface of said head slider body, wherein a main chain of a lubricant of the lubrication layer of said head slider body is —(CF2–C2O)n-(CF2-0)m- the same as the main chain structure of a lubricant of a lubrication layer of said medium;

a terminal group of the lubricant of the lubrication layer of said head slider body is selected from a group consisting of Fomblin Zdol family, Fomblin AM 3001 family, Amine family, MORESCO PHOSFANOL family, and Fomblin Tetraol family; and said terminal group of said head slider body is different from the terminal group of the lubricant of the lubricant layer of said medium.

2. An information memory storage device comprising, within a housing having a base, a rotatable medium, a carriage having a head slider at an end thereof, wherein said head slider has a head slider body, and a magnetic circuit which rotates the carriage in opposite directions, said medium including:

a substrate;

a magnetic layer on a surface of the medium; and a lubrication layer on a slider surface of said head slider body, wherein a main chain of a lubricant of the lubrication layer of said medium is —(CF2–CF2O), —(CF2-0)m; and a terminal group is selected from a group consisting of Fomblin Zdol family, Fomblin AM 3001 family, Amine family, MORESCO PHOSFANOL family, and Fomblin Tetraol family;

wherein a main chain of the lubricant of the lubrication layer of said head slider body is —(CF2–CF2O)n-(CF2-O)m- the same as the main chain structure of the lubricant of the lubrication layer of said medium;

a terminal group of the lubricant of the lubrication layer of said head slider body is selected from a group consisting of Fomblin Zdol family, Fomblin AM 3001 family, Amine family, MORESCO PHOSFANOL family, and Fomblin Tetraol family; and said terminal group of said head slider body is different from the terminal group of the lubricant of the lubricant layer of said medium.

3. An information memory storage device comprising, within a housing having a base, a rotatable medium, a carriage having a head slider at an end thereof, wherein said head slider has a head slider body, and a magnetic circuit which rotates the carriage in opposite directions, said medium including;

a substrate;

a magnetic layer on the substrate;

a lubrication layer on a surface of the medium, a lubrication layer on a slider surface of said head slider body, wherein a main chain of a lubricant of the lubrication layer of said medium is —(CF2–CF2O)n-(CF2-0)m;

a terminal group has a structure in which

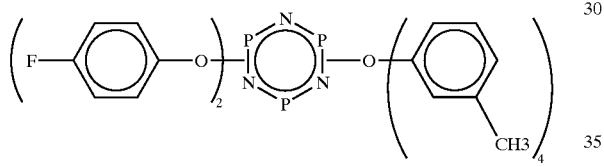

is added to Fomblin Zdol family; and a main chain of a lubricant of the lubrication layer of said head slider body is —(CF2–CF2O)n-(CF2-0)m- the same as the main chain structure of the lubricant of the lubrication layer of said medium;

a terminal group of the lubricant of the lubrication layer of said head slider body is selected from a group consisting of Fomblin Zdol family; Fomblin AM 3001 family, Amine family, MORESCO PHOSFANOL family, and Fomblin Tetraol family; and said terminal group of said head slider body is different from the terminal group of the lubricant of the lubricant layer of said medium.

4. An information memory storage device comprising, within a housing having a base, a rotatable medium, a carriage having a head slider at an end thereof, wherein said head slider has a head slider body, and a magnetic circuit which rotates the carriage in opposite directions, said medium including:

a substrate;

a magnetic layer on the substrate;

a lubrication layer on a surface of the medium; and a lubrication layer on a slider surface of said head slider body, wherein a main chain of a lubricant of the lubrication layer of said medium is —(CF2–CF2O)n-(CF2-0)m; and a terminal group is selected from a group consisting of Fomblin Zdol family, Fomblin AM 3001 family, Amine family, MORESCO PHOSFANOL family, and Fomblin Tetraol family;

wherein a main chain of a lubricant of the lubrication layer of said head slider body is —(CF2–CF2O)n-(CF2-0)m- the same as the main chain structure of the lubricant of the lubrication layer of said medium;

a terminal group of the lubricant of the lubrication layer of said head slider is Fomblin AM 3001 family; and said terminal group of said head slider body is different from the terminal group of the lubricant of the lubricant layer of said medium.

* * * * *

UNITED STATES PATENT AND TRADEMARK OFFICE
CERTIFICATE OF CORRECTION

PATENT NO. : 6,643,098 B2  Page 1 of 1
DATED : November 4, 2003
INVENTOR(S) : Shinichi Takahasi It is certified that error appears in the above-identified patent and that said Letters Patent is hereby corrected as shown below:

Column 15,
Line 30, delete " 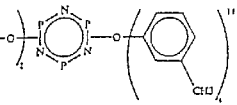 "

and insert 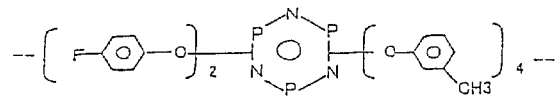

Signed and Sealed this

Twentieth Day of July, 2004

JON W. DUDAS
*Acting Director of the United States Patent and Trademark Office*